April 28, 1959     R. E. FEARON ET AL     2,884,534
WELL LOGGING BY SELECTIVE DETECTION OF NEUTRONS
Original Filed July 30, 1949     5 Sheets-Sheet 4

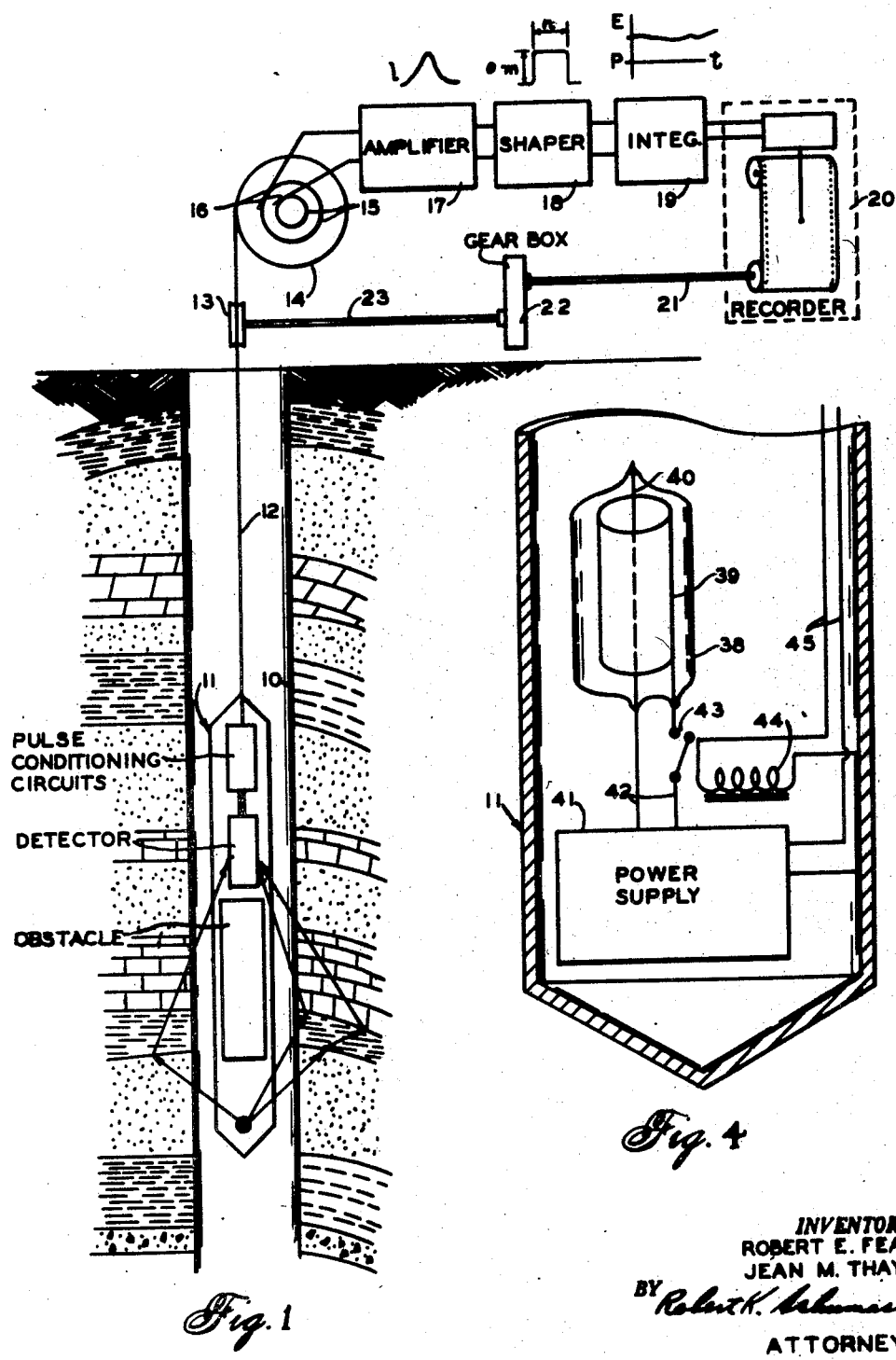

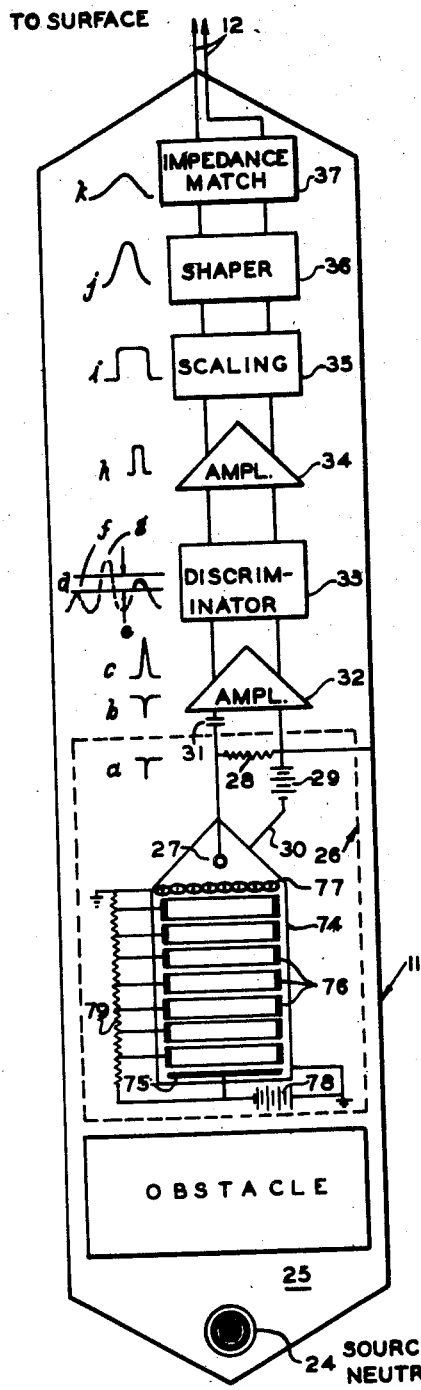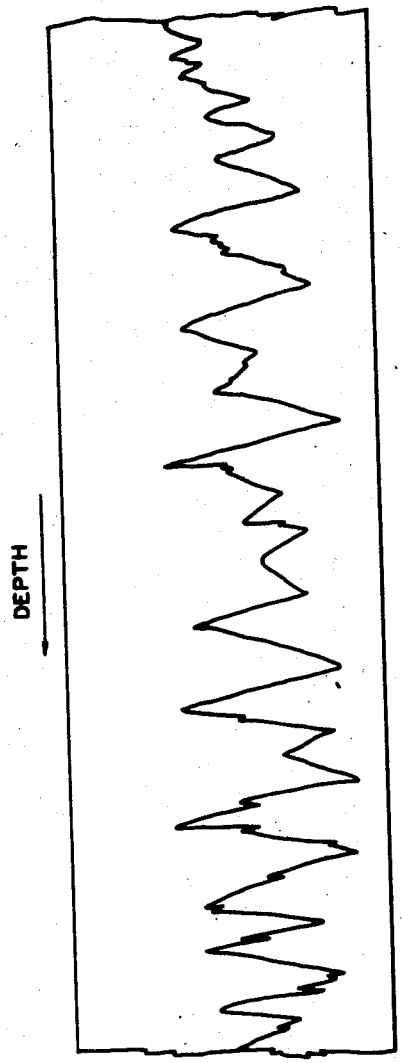

INVENTORS
ROBERT E. FEARON
JEAN M. THAYER
BY
ATTORNEY

April 28, 1959 R. E. FEARON ET AL 2,884,534
WELL LOGGING BY SELECTIVE DETECTION OF NEUTRONS
Original Filed July 30, 1949 5 Sheets-Sheet 5
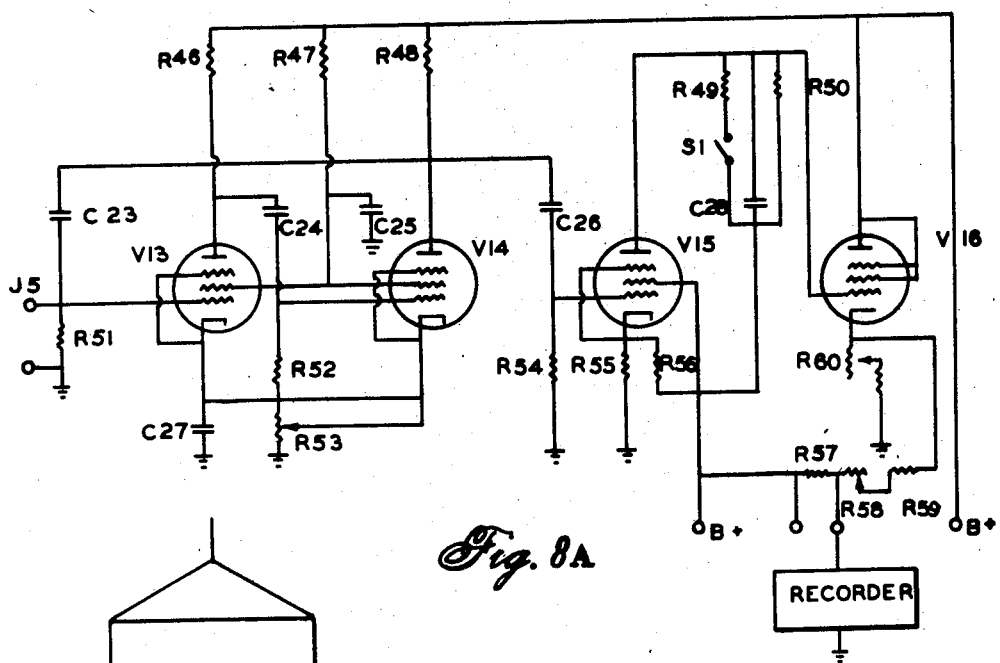
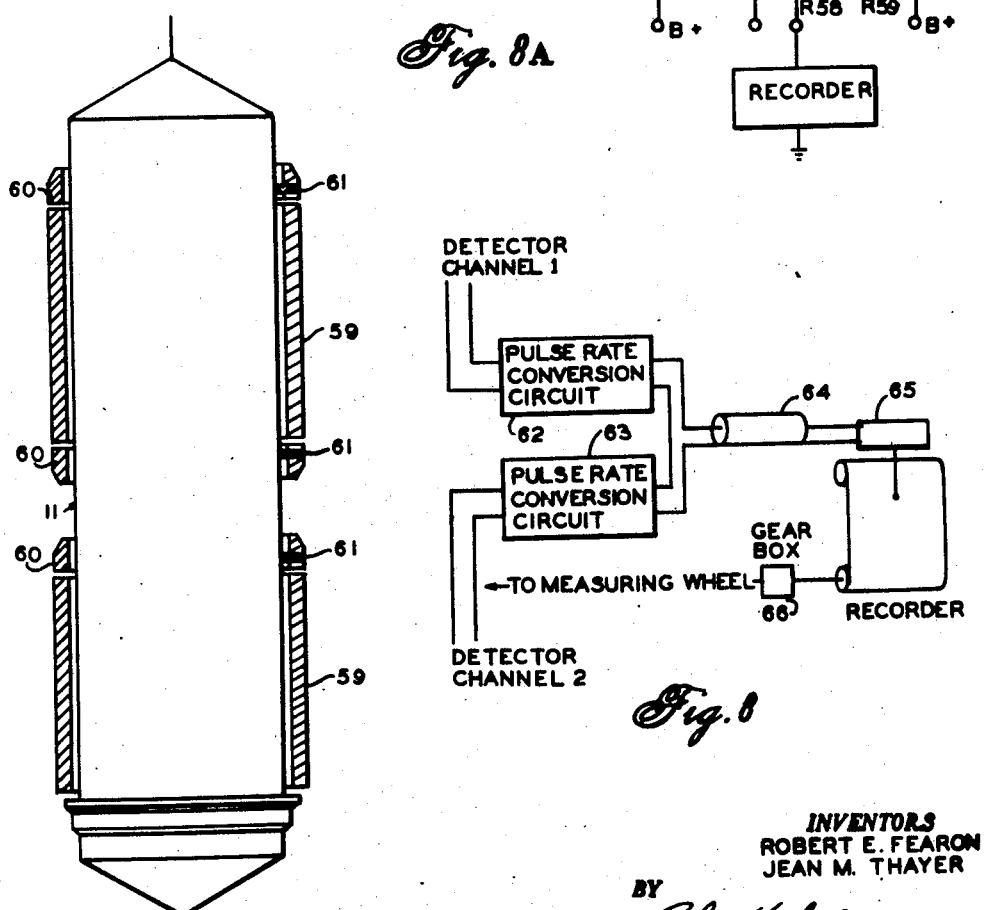
INVENTORS
ROBERT E. FEARON
JEAN M. THAYER
BY
ATTORNEY

United States Patent Office 2,884,534
Patented Apr. 28, 1959

2,884,534

WELL LOGGING BY SELECTIVE DETECTION OF NEUTRONS

Robert E. Fearon and Jean M. Thayer, Tulsa, Okla., assignors to Well Surveys, Inc., a corporation of Delaware Original application July 30, 1949, Serial No. 107,806, now Patent No. 2,712,081, dated June 28, 1955. Divided and this application April 19, 1954, Serial No. 423,970

4 Claims. (Cl. 250—83.6)

This invention relates generally to a method and apparatus for identifying substances existing in a difficultly accessible locations, for example, adjacent to a deep narrow drill hole, and more particularly to a method and apparatus for identifying and distinguishing these substances from each other by nuclear reactions in the substances. This is a division of our copending application, Serial No. 107,806, filed July 30, 1949, for a Method and Apparatus for Neutron Well Logging, now U.S. Patent No. 2,712,081.

This invention is directed to the solution of a problem which has been long recognized by geologists and geophysicists, and by others, confronted with the problem of locating valuable substances, such as petroleum, in the sub-surface formations of the earth. The problem of discovering with certainty the existence of a particularly valuable substance in the sub-surface formations of the earth has only been partially solved by the prior art workers. All prior efforts to solve the problem have met with failure for the reason that no parameter could be found which was solely characteristic of the valuable substances that it was desired to locate. As an example, in the art of well logging a partial solution to the problem goes as fas as determining with certainty that either salt water or petroleum exists in a particular formation but a complete solution is not possible, since prior to this invention, no parameter was known whereby the two substances could be distinguished, in situ, from each other.

Numerous other methods advanced by the workers in the prior art for locating valuable substances in the sub-surface formations of the earth include: electrical methods which involve the measurement of self-potential, conductivity, and resistivity; thermal methods; seismic methods which treat of the acoustical properties of the sub-surface formations; natural radioactivity of the formations; and those methods in which the formations are irradiated with radioactive radiations and an effect such as the gamma radiation produced by the neutron interactions in the formations measured. All of these methods as well as others which have not been enumerated above, have not afforded a complete solution to the above problem in that none of them measures a parameter that is solely characteristic of the valuable substances that one is desirous of locating.

For the purpose of particularly describing and setting forth the respects in which this invention differs from and represents advancement upon the prior art, there is set forth a description of the efforts of previous workers insofar as they have been directed to the problem which has been stated in the previous paragraph.

The location of petroleum has been attempted by various well logging methods which are sensitive to some physical characteristic imparted to the rocks by the presence of petroleum in them. For example, resistivity methods in combination with other methods somewhat ambiguously enable detection of petroleum. The inconvenience and uncertainty of the use of resistivity methods arise from the fact that resistivity is a general property of rocks, and is possessed by some rocks not containing petroleum to an even greater extent than the degree to which the property is manifested by certain other rocks full of petroleum. For example, Indiana limestone will be found to have a much higher resistivity than oil saturated sandstone of the Frio formation in the Gulf Coast oil fields. Furthermore, sandstone which contains natural gas, has a high resistivity, as does also coal. Moreover, limestone may show a decrease of resistivity where an oil bearing horizon appears. It could similarly be shown how each and every one of the other non-nuclear logging methods have specific shortcomings which analogously prevent them from being or amounting to a specific recognition of petroleum.

In the art of nuclear well logging, to which this invention belongs, particular attention is called to the method described by John C. Bender in his United States Patent No. 2,133,776, in which he recites a method of observing secondary radiations caused by exposing the formations adjacent to a bore hole to primary radiation such as X-rays, and radiations of radium and uranium. The property of matter which one would observe in carrying out the disclosure of Bender can be said to be related to electrons in the matter. This property is shared by all substances to a greater or lesser degree, and is not, therefore, capable of making a specific distinction of petroleum.

There are also two methods which have been previously discovered and disclosed in United States Patents Nos. 2,308,361 and 3,349,712, by Robert E. Fearon, in which is described bombarding the strata of the earth adjacent to a bore hole with neutrons and observing any secondary rays that may be produced from the formations as influenced by the bombardment. This capacity of material to react with neutrons and give secondary rays of several sorts is a common and highly distributed property possessed by the substances of the earth. These methods, moreover, enable measurements to be made which are specifically influenced by the presence of hydrogen. The way in which the influence of hydrogen comes into play in these previous inventions is through its ability to partially prevent neutrons from a source, separated from a detector of secondary radiation, from arriving in the vicinity of the detector. Without arriving in the vicinity of the detector, they are, of course, unable to react upon general characteristics of the matter there present, or produce secondary rays of any nature.

The specific indication of hydrogen through this phenomenon, which occurs in the practice of the above mentioned patents, is the nearest approach to a direct observation of petroleum. The recognition of hydrogen, desirable though it is, falls short of the solution of the problem of identifying petroleum, because of the presence of hydrogen in nearly all porous strata. The hydrogen combined with oxygen, as water, is generally present in porous strata. The shales also are very rich in hydrogen though non-porous and not usually a source of petroleum. To secure a specific recognition of petroleum will require some kind of observation or system of observations which would relate themselves more specifically to its occurrence. Petroleum is characterized by the presence of both hydrogen and carbon in the absence of oxygen. The presence of hydrogen in the absence of oxygen is characteristic of petroleum even though the carbon content not be measured.

Folkert Brons has set forth in his United States Patent No. 2,220,509, a method generally similar to the above two methods in which the observations are ascribed to that form of secondary radiation which comprises slow neutrons. He provides that his observation be based upon the detection of those neutrons which have been diffused, or slowed down, by interactions with elements in the strata of low atomic weight. He effects his measurements by producing, in the detector of radiation, disintegration products resulting from the reaction of his slow neutrons with the atomic nuclei which are there present, and detecting these disintegration products as an indication of the presence of slowed-down neutrons. As specified by Brons, his method of observing a particular class of secondary radiation, caused by neutron bombardment, is particularly sensitive to the presence in the strata of atoms among which the neutrons may diffuse, and which are of low atomic weight. Since the most outstanding example of low atomic weight atoms in the earth is the element hydrogen, the property to be observed by Brons will, like the previous inventions of Robert E. Fearon, give particular emphasis to hydrogen. The general weaknesses of these methods are thus apparent, as they are applied to the problem of identification of petroleum.

Russell has disclosed, in his United States Patent No. 2,469,462, a method of making observations which rely upon certain other properties of strata enabling him to perform measurements which ignore the concentration of hydrogen present therein. These other properties, thus observed, will obviously correspond with different geological factors and will correlate differently than is the case for methods which are preeminently hydrogen-sensitive.

As Russell states, his log "indicates the presence of and evaluates other variables affecting the usual neutron log, such as an increase or decrease in hardness or intensity of the gamma rays of neutron capture which almost necessarily occurs with a change in concentration of the elements chiefly responsible for capture."

It may be set forth that Russell's method, if practiced in accordance with his specification, will be particularly sensitive to the extent of neutron capture for neutrons of high energy. This is true since he makes his observation, among other things, at a distance at which the rate of production of degraded neutrons of low energy has not risen to the value expected for large thicknesses of matter. Thus, in his case, there are in the vicinity of the detector of radiation, a relatively larger population of energetic neutrons, and the effects of these neutrons on the detector are therefore more likely and are relatively emphasized. Now it is the nature of his invention, from the standpoint of nuclear physics, that the reactions of carbon with neutrons are quite improbable. It is not, therefore, to be expected that Russell could, by his method, recognize petroleum except ambiguously through his provision of means sensitive to the presence of hydrogen, which he has also set forth in this patent.

Therefore, this patent of Russell's, like the others enumerated above, falls in the general class of nuclear methods not giving specific recognition of petroleum, and, because of this shortcoming, does not represent a complete solution to the problem which has been recited.

In his United States Patent 2,469,463, Russell has specified means of measuring and comparing several additional factors in neutron well logging, which are not primarily or chiefly related to hydrogen content. It might be said that in this invention, Russell has set forth a means of measuring the factor "C," which has been defined, and to which significance has been attributed in column 1, page 37 of volume 4, No. 6, Nucleonics, June 1949. As can be seen from consideration of this published discussion of this factor, it will not be easy to measure, because of its relatively small variations from one rock type to another. Furthermore, specifically, there is nothing especially indicative of petroleum which will influence this factor. Unfortunately, contrary to Russell's statements, the ability of hydrogen to capture neutrons is quite appreciable, when compared with other elements commonly present in the earth. Also, hydrogen stands apart among the elements of the earth in that it emits uncommonly little gamma-ray energy per neutron which it captures. For these reasons, the practice of Russell's Patent 2,469,463, will still result in a measurement which is preeminently affected by hydrogen, and which is therefore unable to specifically identify petroleum, and does not represent the solution to the problem to which this invention is directed.

Russell's Patent No. 2,469,461, is a method of studying density by scattering of gamma rays from subsurface strata. There is no indication that there is any specific correlation between density and the occurrence of fluid in the pore spaces of rocks. Too many factors unrelated to the occurrence of fluid have a larger effect on density. Kind of rock minerals predominantly present, amount of cementation, amount of pore space, all have a great effect, and prevent Russell's gamma ray scattering procedure from being used as a method of specifically identifying petroleum. This invention of Russell therefore also falls short of being a solution to the problem to which the present invention is directed.

The instant invention provides a complete solution to the above problem. This solution consists of a system of observations by which the operator is enabled to recognize and quantitatively measure nuclear species of the subsurface formations adjacent a bore hole. Although the desired substances quite often are not elements or single nuclear species the chemical laws of combining proportions enable accurate appraisal of such things as the occurrence of petroleum. Recognition of nuclear species is accomplished by subjecting the substance adjacent to the bore hole to bombardment with penetrating radiations of a nature to cause specific and determinative quantized changes in the potential energy of the said nuclear species. These quantized energy changes which are specific to the particular kinds of atoms to be determined are used as a means of recognizing the desired atoms, which recognition is accomplished by means of selective neutron detection, selective for specific energy ranges of neutrons, and/or specific limits of direction of incidence and sense of direction of incidence.

Among the means which are required for the solution of the above problem, there is provided exceedingly powerful and energetically efficient monoenergetic neutron sources, relying upon the nuclear reactions caused by electrical or electromagnetically accelerated particles. These are provided in a form which is adapted to be lowered into a bore hole, and employed therein to bombard the rocks adjacent to the bore hole. Also required for the practice of this invention are powerful capsuled neutron-emitting sources, depending for their operation upon energetic particles emitted by radioactive substances. There is set forth the manner of choosing and designing such neutron-emitting sources, showing how a person skilled in the art can avail himself of intensities hundreds of times greater than those which are now available.

Required in the practice of this method are various means of observing neutrons which permit the determination of the energy, the direction of incidence of neutrons, and the sense of direction.

Among these means, there are provided devices which determine both energy and direction of incident neutrons within certain limits. There is also provided a device for detecting phenomena described in nuclear physics as n-p reactions. This device enables exact determination of energy of neutrons, and a somewhat ambiguous determination of direction. Incidental to the practice of this invention also is a device for resolving nuclear data which gives only a general indication of energy, and interpreting this general indication of the energy of neutrons in a more exact way. There is also provided, as a means of practicing this invention, a choice of the manner of employment of a number of neutron filters adapted to select specific energy groups of neutrons. It is shown how these filters may be employed for the purpose of identifying specific elements in the strata.

Therefore the primary object of this invention is the provision of a method and apparatus for identifying valuable susbtances by separately measuring the influence of specific properties of the nuclei of the valuable substances upon a flux of fast neutrons.

Another important object of this invention is the provision of a method and apparttus whereby petroleum can be positively identified in the subsurface strata adjacent a bore hole.

This invention also contemplates a method and means for locating valuable substances situated in difficultly accessible locations by identifying and measuring the influence of at least one of its elementary components on a flux of fast neutrons.

Still another object of this invention is to achieve the above objects by irradiating formations with fast neutrons and measuring the intensity of neutrons falling within specific energy bands and which have rebounded from the formations.

Another object of this invention is to provide a method and means for producing a log of a drill hole by recording versus depth the average rate of occurrence of processes occasioned by fast neutrons of selected energies which enter the detecting device.

A further object of this invention resides in the provision of a method and means for detecting neutrons, selecting pulses produced thereby whose energies lie in a predetermined range, and recording their time-rate of occurrence versus depth.

This invention further contemplates a novel method of neutron well logging in which no shield or obstacle is required between the source and detector.

A further object of this invention resides in the provision of a shield or obstacle of selected characteristics that may be disposed between the neutron source and detector.

Another object is to provide means for delivering to a recorder electrical signals which denote the intensity of neutrons of a definite energy class.

This invention also contemplates means for determining specific energy losses in samples of substances exposed to neutrons of a determined energy for the purpose of adjusting energy selective neutron detector systems used in well logging.

Another object is to provide a method and means to accomplish deep investigation in a direction perpendicular to a bore hole and concurrently provide very detailed resolution of thin strata.

Other objects and advantages of the present invention will become apparent from the following detailed description when considered with the drawings, in which Figure 1 is a schematic illustration of a well logging operation showing the surface recording system;

Figure 2 is a diagrammatic illustration of a subsurface instrument with the detector illustrated in vertical section;

Figure 3 illustrates the type of well log that would be produced by the present invention;

Figure 4 is a fragmentary sectional view of a subsurface instrument showing one of the novel neutron sources, contemplated by this invention, in operative position therein;

Figure 7 shows a schematic illustration of a subsurface instrument having removable shields thereon;

Figure 8 shows a schematic wiring diagram illustrating a use of pulse rate conversion circuits;

Figure 8A is a detailed wiring diagram of a pulse rate conversion circuit;

Figure 5:
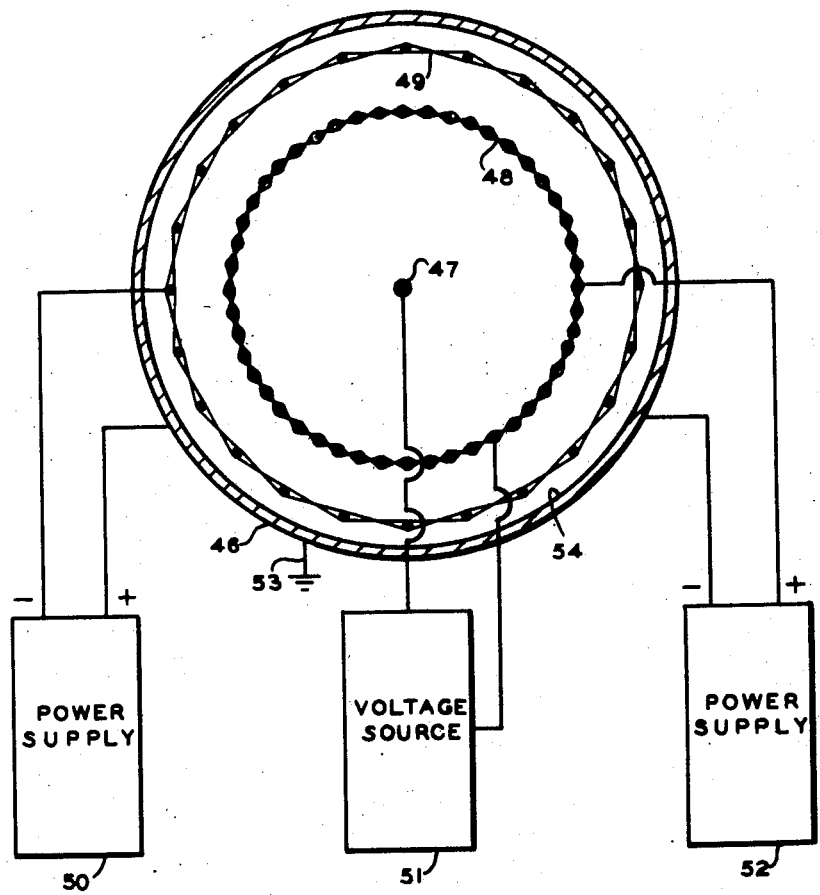
Figure 5 illustrates diagrammatically a modified form of neutron source.

As pointed out above, consideration of the problem of well logging has led to the conclusion that there is a necessity for the discovery of methods which will identify more specifically the substances found in the rocks adjacent to wells which are logged. Specific identifying properties, which could be relied upon as a means of recognition of substances, must be able to cause an effect which is observable under the logging conditions which prevail. Preferably the process making the observations possible should be one which acts through space and through matter which fills the space between the position in which the rock to be identified is found, and the location of the detecting apparatus in the bore hole. The necessity for acting through space arises because of the prevalence of casing and/or cement and/or fluid of various sorts which commonly exist in the well bores, and which interfere with the measuring process. Another reason why considerable action through space is essential is the need for the depth of investigation to be adequate. Considerable depth of investigation is a highly desirable factor in well logging because of the heterogeneity of rocks making shallow observations unrepresentative, and therefore inaccurate as a representation of the whole mass of rock penetrated.

There are available at the present time only a very few types of influences by which desirable observations as discussed above may be made. Obviously, the magnetic and electric fluxes are not available for consideration in connection with cased wells, and the electric flux is unusable when investigating non-conducting material. The observation of the heat flux is familiar in the art of well logging and has patently the disadvantage that such observations are slow if one desires a considerable depth of investigation. The transmission of observable infrared and ultraviolet radiations is excluded because of the opacity of substances generally present in the earth and in bore holes. The gravitational flux has satisfactory properties, and, in principle, could be measured. But no known means of measuring it for well logging purposes has been found.

In attacking the above problem, seeking for a method of specific recognition of material in the circumstances of a bore hole penetrating the rock strata of the earth, it has been discovered that there are apparent specific properties of atomic nuclei corresponding with energy transitions in those nuclei. These transitions may evidence themselves in a variety of ways, such as:

*a*. The emission of radiant energy through space.

*b*. The absorption of a particular amount of energy from a bombarding particle or quantum.

*c*. A specific energy threshold or a plurality of energy thresholds of susceptibility of the nuclei to certain classes of nuclear change, which may be caused by bombarding corpuscles or quanta.

It has been discovered that in all branches of molecular, atomic, and sub-atomic physics, one may generally predict that if a specific energy transition is possible in a quantized system, there will be a resonance effect, specifically affecting bombarding particles or quanta possessing energy (either kinetic or potential) in the close vicinity of the amount required to produce a quantized transition. The discovery of the details of quantization of nuclei of atoms still waits for extensive experimental and theoretical work. Limited experimental evidence has already brought support to the conviction which exists in the minds of all nuclear physicists to the effect that nuclei will surely be found to be quantized systems. In some instances energy thresholds of various kinds have already been determined for nuclei. For example, the photoneutron threshold is now known experimentally through the study of its inverse process, capture, by Kibischek and Dancoff.

A specific energy threshold at 20 megavolts has been found for the system comprising 4 nucleons (2 protons and 2 neutrons). Sundry isomeric transitions corresponding with highly forbidden transformations of the arrangements of nucleons have been found experimentally and can be considered as additional evidence of the truth and experimental significance of the general conclusion that nuclear matter exists in quantized energy states.

In an effort to make use of the foregoing general conclusion, it has been discovered that only two classes of radiation appear to exist which react with nuclear matter appreciably and can be arranged conveniently for the observation of quantized energy levels of nuclei. These classes of radiation are the photon or electromagnetic class, and the corpuscular class comprising neutrons. Other particles (charged) in general do not penetrate the coulomb field of force surrounding a nucleus at energy falling in the range of possible excitation processes of common nuclei. Such excitation processes are typically expected for light nuclei in the vicinity of 1 million electron volts.

Charged particles lack action through a distance as defined herein. Therefore, corpuscular radiations of the charged variety would, in principle, not be particularly useful for investigation of the quantized levels of nuclei. Of the classes of radiation which have been suggested, the only one which has been discovered which has a favorable ratio for the amount of interaction which it undergoes with nuclear matter, as compared with the energy transitions effected in the progress of the radiation by circumstances arising outside the nuclei of atoms, is the neutron. The photon reacts extensively with orbital electrons, and has only a very small cross section (target probability) for interactions with nuclei as such. There is furthermore an additional reaction of photons which becomes prominent above 2 electron megavolts, and which, in the range above 2 electron megavolts, results in materialization of electron-positron pairs. This materialization, though influenced by the presence in the near vicinity of the nuclear field of force, does not represent a specific or identifying characteristic of particular nuclei, but is a general characteristic of all nuclei, more prominent for the nuclei of heavy elements like lead and less prominent for the nuclei of light elements such as aluminum. For the above listed reasons, there appear to be only a few especially simple reactions caused by photons which might be of any use. One might find it desirable to observe the neutrons released from nuclei by photons, since there is, for such nuclear photo-neutrons, a specific threshold of energy for each nuclear species (element or isotope thereof). One might also investigate the "unmodified" Compton scattering of energetic photon radiations in the hope of finding some slightly modified lines which suffered loss of energy by interaction with nuclei. This possibility is somewhat favored by the fact that the otherwise much stronger modified Compton scattering radiation is rapidly eliminated from the flux by absorption.

On the other hand, the interaction of neutrons with the outside parts of the atom is so small that the direct production of ion-pairs by neutrons is found to occur on an average of only about one time per meter of ordinary atmospheric air for a neutron possessing a kinetic energy of five million electron volts. The liberation of energy by neutrons in air therefore amounts to less than one thousandth of 1% per meter of air traversed, for energy liberated by processes involving the outside portions of the atoms found in the air. A distance of travel in air which would result in an average loss of energy by reaction with outside parts of the atoms of less than 1%, would, nevertheless, result in total absorption of the neutrons, and all their energy, by reaction with the nuclei of the atoms contained in air. Even so, many of the reactions which neutrons undergo, which occur between neutrons and nuclei of the matter, are not highly specific, nor do they aid in any refined efforts to identify such matter. Among the unidentifying nuclear reactions one may name, for example, conservative ballistic nuclear scattering of neutrons, that is, conservative of total kinetic energy. This process is specifically different to an extreme degree only in the case of very light elements such as hydrogen and helium. The average nature of other matter contained in the rocks is sufficiently alike in this respect that the main possibility of use of the property of conservative ballistic nuclear scattering of neutrons is to observe differences in the propagation of neutrons through the rock which enable conclusions regarding the presence of hydrogen to be made. This effect is already made use of, and there exist a considerable number of U.S. patents and other published descriptions bearing on this subject. Among these patents are No. 2,308,361, No. 2,220,509, and No. 2,349,712. The broad class under which these previously named inventions fall corresponds with a patent issued to John C. Bender, No. 2,133,776.

The theory of detection of hydrogen by conservative ballistic nuclear scattering is treated in an article written by Robert E. Fearon and published in the June 1949, issue of Nucleonics, entitled "Neutron Well Logging."

The above theory finds general application in pursuing this method, and Figures 1 and 2 more particularly set forth the details of arrangements through which these general concepts find specific application to the problem set forth above.

Referring to these figures there is illustrated an application of this invention to a well surveying system. In Figure 1 there is shown schematically a drill hole 10 which may or may not be cased. Disposed in the drill hole and adapted to be raised or lowered therein is a housing 11 supported by a cable 12. Cable 12 comprises at least one electrical conductor connecting the electrical apparatus within the housing 11 to apparatus located adjacent the mouth of the drill hole 10. The apparatus on the surface of the earth consists of a measuring wheel 13 over which the cable 12 passes and a winch or drum 14 on which the cable is wound, or from which it is unwound, when the housing 11 is raised or lowered in the drill hole 10. Conductors are connected to the cable 12 by means of slip rings 15 and brushes 16 carried on one end of drum 14. These conductors lead to an amplifier 17. Amplifier 17 is a conventional audio amplifier having a flat frequency response. The output of amplifier 17 is conducted to a pulse shaper 18, the purpose of which is to insure the delivery of square topped waves of constant height to an integrator 19. Integrator 19 is adapted to receive the aforementioned pulses and generate therefrom an electromotive force which is proportional to the average time-rate of occurrence of the pulses. This signal is delivered to the recorder 20 where it is recorded versus depth. The depth axis of the recorder is actuated by the shaft 21 which leads from a gear box 22, connecting through shaft 23 to the measuring wheel 13. The gear box 22 has adjustments to enable suitable choice of depth scales.

Referring specifically to Figure 2 a description of the contents of housing 11 will follow. It is to be understood that housing 11 will be constructed to withstand the pressures, and mechanical and thermal abuses encountered in surveying a deep bore hole and yet provide adequate space within it to house the necessary apparatus and permit the transmission of radiation through it.

In the bottom portion of housing 11 there is located a radiation source 24 which may be surrounded by a radiation filtering material 25. This radiation source may take various forms which will be described in detail later in the specification. Above the filtering material 25 and lying between the source of radiation and a radiation detector 26, there is a region of space which may be occupied by suitable materials or left vacant determined by considerations explained as the description progresses.

The detector 26 is of the type which will detect neutrons as a result of the production of prominent bursts of ionization therein, caused by rapid movements of heavy charged particles such as protons, alpha particles, etc., set in motion by the neutrons. The bursts of ionization are very quickly collected in the detector 26. These bursts are registered as electrical pulses and resolved timewise from other or smaller pulses which may occur almost concurrently. The detector 26 is so designed and so operated that the magnitude of the electrical pulse released from the collection of a specified amount of electrical charge will always be quite accurately proportional to the amount of the electrical charge collected and substantially independent of the path in the detector along which the burst of ionization occurred.

The current corresponding to a pulse, flowing in the electrode circuit which includes conductor 27, resistance 28, battery 29 and conductor 30, produces a voltage pulse across the resistance that is of the form illustrated at $a$. The pulse produced across the resistance 28 is impressed through the condenser 31 upon the input of an amplifier 32. As shown at $b$ the pulse has suffered negligible loss and no distortion in passing through the condenser 31. The amplifier pulse, illustrated at $c$, has been inverted in polarity but otherwise faithfully reproduced. It is then conducted to the pulse height distribution analyzer 33. Here only those pulses whose magnitude fall within a prescribed range, such as illustrated at $d$ and designated by $e$, are accepted and transmitted. Other pulses such as are illustrated at $f$ and $g$ are not accepted and transmitted. Those pulses which are accepted and transmitted are delivered to am amplifier 34. Amplifier 34 is one having a flat frequency response extending upward to the highest frequency required to faithfully amplify the pulse delivered to it in a manner shown at $h$. The output signal from the amplifier 34 is fed into a scaling circuit 35 which, in a known manner, delivers pulses as illustrated at $i$, the number of which, occurring in a given time is less by a constant factor than the number received in the same interval of time. The output of the scaling circuit is fed into a shaper 36 which transforms the pulse into the shape illustrated at $j$. The shaper 36 may take the form of a powdered iron core transformer. The signal from the transformer is then fed into impedance matching means 37, such as a cathode follower, which faithfully reproduces the voltage wave as illustrated at $k$. The impedance matching means 37 introduces the signal into the transmission line contained within the cable 12 for the purpose of transmitting it to the surface.

It is to be understood that all elements within the housing 11 which require power may be powered in a conventional manner as taught in the art by means such as batteries or rectified alternating current. Batteries which very satisfactorily fulfill the temperature requirements in hot wells are the zinc, potassium hydroxide, mercuric oxide cells.

Again referring to Figure 1, the signals transmitted to the surface by means of cable 12 are taken therefrom by means of slip rings 15 and brushes 16 and are conducted to the amplifier as pulses, one of which is illustrated at $l$. These amplified pulses are received by a pulse shaper 18 which modifies their form in the manner illustrated at $o$. The pulse illustrated at $o$ will always have a fixed square form with a fixed height $m$ and a fixed width $n$. These substantially square pulses are then fed into the integrating circuit which delivers the signal to the recorder 20, as has been previously described. The integrating circuit thus produces a time-dependent voltage wave such as shown at $p$. When this signal is impressed on the recorder, which has been coordinated with depth, a curve will be drawn as shown in Figure 3. This curve has as its ordinate depth in the bore hole and as its abscissa a function of an intensity of received radiation, or of a plurality, or combination of intensities. These intensities may be combined by adding, subtracting, or dividing in any desired manner, or may be otherwise mathematically combined. The manner of combination is suitable to specifically indicate, or be especially sensitive to, the presence of a particular substance in the region adjacent the bore hole. Any combination of measurements indicating the presence of a relatively large amount of hydrogen and only a relatively small amount of oxygen indicate petroleum. Measurements of carbon may be made simultaneously to further identify the hydrocarbons of petroleum.

Although no power supply has been shown in connection with the surface apparatus, it is to be understood that it will be powered in a conventional manner such as was pointed out in connection with the subsurface apparatus.

As can be understood from previous parts of this application, it is an object of this invention to measure only certain parts of an otherwise less informative flux of scattered, diffused, or partially absorbed flux of neutrons, and to use data concerning the intensity of these dissected portions of the neutron flux as a means of obtaining more specific information regarding the nature of the substance by which the primary neutron flux is diffused, scattered or absorbed. Quite naturally, therefore, it may be seen that the measurement proposed herein is more difficult in certain particulars than those called for by the discoveries of the prior art. For example, the requirement that there be, within the interval of time in which a measurement is performed, a statistically sufficient number of processes to produce an accurate observation of the average rate of occurrence of such processes, will be less satisfactorily met. This conclusion is derived from the proposition that this discovery concerns itself in each instance with a measurement of only a part of the neutron radiation. Probable error in the measurement of any radiation is decreased when adequate intensity prevails, the percentage probable error in general being inversely proportional to the square root of the intensity. For illustration, therefore, if there are neutrons composing an energy spectrum uniformly distributed from zero to five million electron volts, and it is desired to observe that portion of the energy spectrum lying between three thousand four hundred electron kilovolts, and three thousand five hundred electron kilovolts, the percentage probable error of such a measurement will be approximately seven times worse than it would be if the measurement had used all the neutrons. It follows, therefore, that strong fluxes of neutrons are needed to practice this well logging method. It likewise follows that, if the neutrons are to be undirected, there is need that they be generated in some isotropic nuclear process.

The strength of neutron source required will be related to the economic requirement of logging speed, and the error which is considered tolerable in a given case, by the formula $$\rho = 1.5 \times 10^{-6} \frac{S}{\delta}$$

where S is logging speed in feet per hour $\delta$ is the fraction of the total flux of fast neutrons incident on the detector from all directions $\rho$ is the intensity of primary neutrons, in units of $10^7$ per second at 8 million electron volts from the source.

Error of $\pm 5\%$ has been assumed (for spacings, source to detector in the range 10"–18").

If the undirected flux of neutrons is monoenergetic, the chosen isotropic nuclear process must of necessity be one in which a constant amount of energy is liberated into the propulsion of the neutron every time the said process occurs. It also follows that if the primary neutron flux is to be of a penetrating nature, the neutrons generated therein must be of relatively high energy. If helium is to be considered as a recoiling substance in a detector of neutron radiation, neutrons cannot be employed which have energies high enough to undergo an inelastic collision with helium. If high energy neutrons are employed, a more complex and ambiguous distribution of recoil energies will occur. To illustrate the ambiguity brought about in such a case, consider, for example, the problem of determining the presence of fast neutrons having a kinetic energy of one million electron volts. If the incident flux of fast neutrons which impinges upon helium contains also some neutrons having energy of 21 million electron volts, absorption of the resonance energy of 20 million electron volts will occur to these, sometimes generating 1 million electron volt neutrons, a fraction of which will be measured, and will be indicated in a manner indistinguishable from the effect caused by the neutrons which had one million electron volts in the first place. This result is altogether avoided if no neutrons having energies equal to, or greater than, 20 million electron volts are emitted from the source.

The requirement that very many neutrons be available is met only if there be sufficient energy dissipated per unit of time by whatever bombardment produces the neutrons. There are two ways of producing an adequate flux of neutrons within the space available for a well logging radiation source. One of these ways is to provide a mixture of beryllium with an alpha-ray emitter of a sufficient degree of activity per unit volume. This achievement is favored if such an alpha-ray emitter (a) has a short half life. This increases the rate of energy liberation per unit weight and per unit volume, other things being equal.

(b) is a parent of a series which gets into equilibrium sufficiently quickly, and which comprises sufficiently numerous alpha-emitting daughter products in the series.

(c) has large energy per alpha particle.

(d) has a low atomic weight.

Of the above 4 conditions, only the first 3 are at all possible since there are fundamentally serious theoretical difficulties which appear to absolutely prohibit the fulfillment of any expectations of consequence with respect to item (d). It may be said further that, with only one exception, which is not of any importance to the uses of this invention, the expectation of the present theory is fully confirmed with respect to the above stated conclusion pertaining to item (d). Of the thousand or so isotopes that are now known, only one having atomic number less than 81, or an atomic weight less than 208, samarium, is found to emit alpha particles. Furthermore, this one exception emits alpha particles of such a low energy, and emits so few of them per unit weight of material per unit time, that it would be utterly useless to consider it as a practical source of bombardment to generate neutrons from beryllium. It is, therefore, perfectly clear that the considerations of the first three items are those which prevail in attempting to arrange a bountiful source of neutrons made of a mixture of beryllium with alpha-ray emitting substance. The particular merits of an arrangement containing an adequate quantity of actinium, or actinium salt, mixed with beryllium have been taken note of in United States Patent No. 2,515,502 and will not be reviewed extensively here, except to note the fact that one can, with actinium, crowd 200 times as much neutron-emitting power into a given space as can be done with radium-beryllium mixtures. Polonium would be a suitable substance for a concentrated source of neutrons. Thorium X would be suitable, and would enable the design of very powerful neutron source with limited available space. Numerous other effective choices of powerful neutron source are possible, and will be apparent to those familiar with the art, upon consideration of the previously outlined conditions for the design of such powerful neutron-emitting sources.

Returning to the general question of powerful and intense sources of neutrons in a broader sense, it is apparent that in the limited space within a well one is at liberty to consider electrically or electro-magnetically accelerated ion beams impinging upon suitable target material provided they do not require particle energy in the beam that is too high to be conveniently producible (considering insulation problems, etc.) within the limited space available. It is clear therefore, that reactions between ionic beam materials and suitable target substances are a matter of consequence to the practice of this invention with increasing emphasis in the case of those target reactions having a low threshold of energy per bombarding ionic particle for their onset.

As is well known in the art of designing R.F. power supplies such as those used for television sets, it is feasible to produce electrical potential differences of the order of 20 thousand volts within a limited space, and insulated by very reasonable thicknesses of rubber or other high voltage insulation.

There are available for consideration two nuclear reactions which can be excited by ionic beams propelled by no greater electrical potential difference than 20 thousand volts. These reactions are:

(a) The bombardment of deuterium atoms by deuterium ions, or if preferred, bombardment of substances rich in deuterium atoms with moving deuterium ions.

(b) Bombardment of tritium atoms or molecules rich in tritium atoms with deuterium ions, or conversely, the equivalent process, bombardment of deuterium atoms, or substances rich in deuterium atoms by moving tritium ions.

This latter reaction is one especially favored for the practice of this invention, because of its large efficiency, and because of the extremely favorable way in which the efficiency of this reaction improves with electrical potential applied at very low electrical potential differences. The second of these reactions is also particularly favored because of the large self-energy, that is, conversion of mass into kinetic energy, by which it is characterized, amounting to approximately 17 million electron volts, of which approximately 14 million are delivered to the neutron which is produced. Owing to the very large self-energy to which reference has been made above, neutrons derived from this preferred target reaction at very low bombarding energies nevertheless have very great energy, and are substantially monoenergetic. The same things can be said, but to a lesser degree, in respect to the first named of the two described bombardments. In it, the self-energy is less, delivering only 2.5 million electron volts to the neutrons, and the efficiency of the reaction is much lower. Accordingly, smaller fluxes of neutrons would be available under like circumstances, and the neutrons would be less monoenergetic.

In Figure 4 of the drawings there is illustrated diagrammatically a neutron source of the type described above. This source can be used in the housing 11 to replace the source 24 shown in Figure 2.

A glass envelope 38 encloses electrodes 39 and 40. These electrodes may be formed of tantalum, uranium or zirconium. Electrode 40 may be a wire or a cylinder of suitable size. Electrode 39 is in the form of a concentric cylinder.

These electrodes are processed to introduce in them deuterium or tritium, or both. This is accomplished by supplying a suitable atmosphere of deuterium or tritium, or a mixture of these, under conditions which enable the electrodes to absorb these gases. Such conditions are produced by heating the electrodes or by conducting an electrical discharge between them as separate processes or both processes may be carried on concurrently. This conditioning of the electrodes is necessary in order that target atoms of deuterium or tritium may be situated in a suitable manner such that they will suffer collisions with bombarding ions. Tantalum, uranium and zirconium were selected as materials for the reason that they have the property of absorbing large quantities of deuterium and tritium.

Electrodes 39 and 40 are disposed in an atmosphere of deuterium gas, tritium gas, or a mixture of both at a pressure of from 1 to 100 microns of mercury.

If it is desired to operate this neutron source as a deuterium-deuterium reactor, the electrodes will be conditioned with deuterium and the final filling atmosphere will be deuterium.

If it is desired to operate this source as a deuterium-tritium reactor, conditioning with deuterium may be followed by filling with tritium, or conversely conditioning with tritium and filling with deuterium may be used.

In both the above arrangements for producing the deuterium-tritium reaction, the substance in the electrodes will exchange with the filling atmosphere, causing the efficiency of the reaction to vary slowly during operation.

Stability of operation, with somewhat lower initial efficiency is secured by conditioning the electrodes with a half and half mixture of deuterium and tritium and filling with the same mixture. Collisions in the target, in this case, are (1) D on Zr _____ No radiation
(2) T on Zr _____ No radiation
(3) D on T _____ 14.2 m.e.v. Neutrons
(4) T on D _____ 14.2 m.e.v. Neutrons
(5) D on D _____ 2.5 m.e.v. Neutrons
(6) T on T _____ Inefficient If the half and half mixture is used the sum of reactions 3 and 4 would predominate about 50 to 1 over the process of item 5 in number of neutrons emitted from these causes. Reaction 6 is inefficient at low bombarding voltages.

Voltage is supplied to the electrodes 39 and 40 from the power supply 41 by means of conductors 42. A switch 43 is provided in one of the conductors 42. Switch 43 may be operated by the solenoid 44 which is energized through the conductor 45 that extends through the housing 11 to the surface of the earth.

The intensity of emission of neutrons will be augmented in increasing proportion as the electrical power delivered to the discharge is increased. The range of energies which will result will depend upon how the energy of the incident ion is divided between the neutron and the recoiling nucleus; this depends upon the direction of the neutron relative to the incident ion. Of the order of $10^9$ neutrons per second can be secured from a discharge dissipating 500 watts of electrical energy, in the D—T reactor.

Where an extremely large flux of neutrons is desired it is expedient to raise the bombardment energy of the D—T reaction to a higher value. This is particularly good because the efficiency of the D—T reaction rises rapidly as bombardment energies of the order of 100 kilovolts are attained. With the space available in a well logging instrument and with the new insulating materials, it is entirely feasible to build electronic voltage generators with output of the order of 100 kilovolts. An example of such a generator would be a high frequency Cockroft-Walton type of apparatus. Particular stress is laid on the high frequency feature in order that the condensers in the circuit would fit in the well logging instrument.

Still another type of neutron source is illustrated diagrammatically in Figure 5. This source produces by the D—D reaction neutrons having energies of approximately 2.5 million electron volts as described in connection with the source illustrated in Figure 4. By employing the D—T reaction, neutrons having energies of approximately 14.2 million electron volts can be produced. This apparatus is also adapted to produce 17 million electron volt gamma rays by the lithium-proton reaction.

Referring to Figure 5 a substantially cylindrical housing 46 encloses a central electrode 47, a first screen 48, and a second screen 49. These elements are disposed in an atmosphere which consists of an isotope of hydrogen or a mixture of such isotopes. Potentials are placed between the elements by the voltage sources 50, 51, and 52. The housing is grounded as shown at 53. The voltage source 50 impresses a potential between the second screen 49 and the housing 46. The screen 49 is made sufficiently negative that the electric field perpendicular to the inside surface of the housing 46 is nowhere positive. The voltage source 51 impresses a potential between the central electrode 47 and the first screen 48. This voltage source serves to strike a low pressure arc to produce and make available positive ions. The voltage source 52 impresses a potential between the screen 48 and the housing 46. This potential produces an accelerating electric field which acts upon positive ions which escape through the screen 48 and causes them to impinge upon a thin layer of target substance 54 which is uniformly deposited on the inner surface of the housing 46. The target material is formed of a diatomic compound of lithium and a suitable isotope of hydrogen.

The electrodes shown in Figure 5 are spaced from one another in a manner which is correlated with the pressure of the filling gas. The radial distance between elements 46 and 48 is made short compared to the mean free path of an electron in the filling gas at the prevailing pressure. The radial distance between elements 47 and 48, on the other hand, is chosen to exceed several times the electron mean free path in the chosen atmosphere. The purpose of these choices is to permit a self-sustaining low pressure arc in the circuit of power source 51 and to forbid it in the circuit of power source 52 as a result of the short space between the electrodes 46 and 48. Any discharge between electrodes 46 and 48 will, therefore, be continuously dependent on replenishment of ions from the space inside of screen 48. Because the electric field between 46 and 48 can accept only positive ions from inside 48, electrons being repelled, the parasitic discharge in the space between electrodes 46 and 48 will be a positive ion affair, continuously replenishing its supply of ions by leakage through the holes in the screen 48. The positive ions leaking through the holes will impinge, in part, on outer screen wires of screen 49, which functions much as does a suppressor grid in a pentode vacuum tube. This outer screen serves to suppress the emergence into the electric field between elements 46 and 48 of electrons emitted by the target material 54. Were the suppressor screen not present, the bombardment of the target with positive ions, and with light and ultraviolet radiation, would cause a copious emission of electrons, which, falling through the electric field between electrodes 46 and 48, would waste the electrical energy of power source 52, which was intended to do work exclusively on the positive ions.

The voltage supplied by source 52 controls the bombarding energy of the ions incident upon the target 54. The choice of this voltage must be varied to suit the requirements of the problem. For example, the D—D reaction has a zero threshold, but a more copious flow of neutrons will occur as the voltage rises. The supply of neutrons from the D—D reaction is observable, and would have some uses at ten thousand volts, but would be very much better at 20,000 volts or more. However, as has been stated earlier, the neutrons will not be as strictly monoenergetic, that is, the energy range will be broader as the bombarding energy rises.

The D—T reaction also has a zero voltage threshold, but becomes importantly efficient at very low voltages. The efficiency of both the D—D reaction and the D—T reaction is satisfactory below fifty thousand volts for well logging purposes. Higher voltages will, however, produce a more copious flow of neutrons, especially in the case of the D—D reaction.

The lithium-proton reaction has a resonance in the neighborhood of 450,000 volts for the production of the 17 million electron volt gamma rays, but like the other reactions, D—D, and D—T, commences at very low voltages.

For the D—D reaction, lithium deuteride would be the target, and the filling would be deuterium. For the D—T reaction the target could be lithium tritide and the filling deuterium, or the target could be lithium deuteride and the filling composed of tritium. These two cases would have an instability due to exchange between the atmosphere and the target, exactly analogous to the instability caused by the same consideration in the case of the tantalum or zirconium source. The instability referred to above may be corrected by using a target composed equally of Li—D and Li—T molecules, and a gas composed equally of deuterium and tritium. For the production of the lithium-proton reaction, a target of lithium hydride will be used, and a filling of ordinary hydrogen. Voltages and spacings will have to be adjusted for these various fillings, and the pressures will have to be adjusted because the mean free path of electrons is not exactly the same in the three isotopes of hydrogen at the same pressures.

Figure 6:
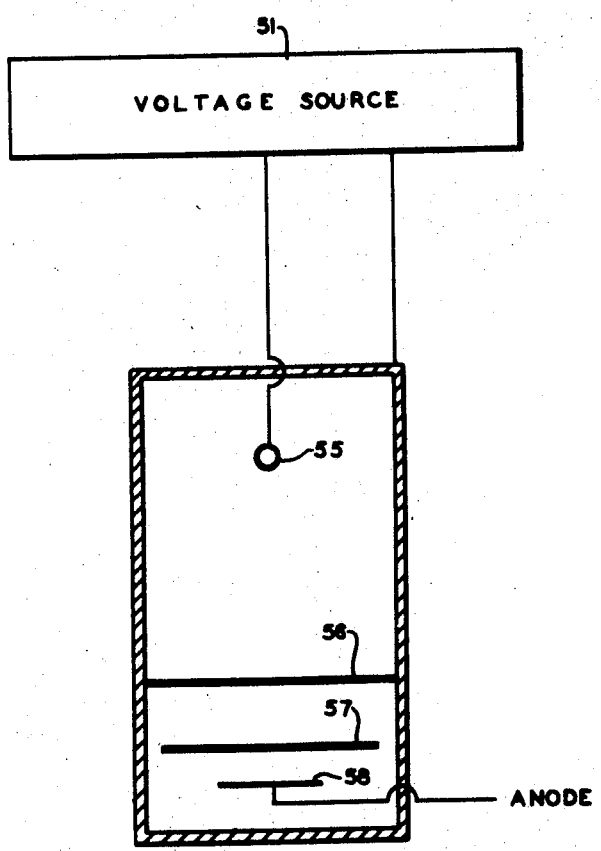
Figure 6 illustrates diagrammatically still another modified neutron source.

In Figure 6 there is illustrated a modified form of the neutron source shown in Figure 5. Its principle of operation is the same. Element 55 corresponds to element 47 in Figure 5. The housing 56 corresponds to element 48 and space charge electrode 57 corresponds with the outer screen 49. The anode 58 corresponds with the housing 46. Similarly a large space exists between elements 55 and 56 and a small space exists between elements 56 and 58. Similarly the large space exceeds by several times the mean free path of the electrons in the filling gas at the prevailing pressure, whereas the short space is chosen less than the mean free path of the electrons.

Besides sources of neutrons, which may or may not be at the same time sources of gamma rays, this well logging arrangement comprises shields adapted to be placed around the source of radiation or around the detector of radiation.

Examples of such shields are shown in Figure 7 in operative position on a subsurface instrument. The shields 59 and retainers 60 are shown in vertical or axial section. The retainer rings 60 may be held in position by suitable set screws 61. Shields 59 may be formed of different kinds of material selected for the particular problem to be explained in detail as the description proceeds.

The space between the source and detector of radiation has often been specified in previously issued patents, Nos. 2,308,361 and 2,349,712, as being filled with material of a nature substantially opaque to the radiations emitted from the source. Though under certain circumstances such an arrangement can be achieved, and although it is at times desirable to attempt to insert between the source and the detector of radiation a substance which is capable of eliminating direct travel of radiation between the source and the detector, it has been discovered that quite often the arrangement of a suitable obstacle will not be practically possible. For example, if 14 million electron volt neutrons are used, and a distance of 4 inches between the source of radiation and the detector is used, there is not in existence any substance or combination of substances which would be capable of substantially preventing neutrons from travelling directly from the source to the detector of radiation. For higher energies of neutrons originating from the primary source, a larger number of distance units can be stated, and a similar degree of impossibility of prevention of direct travel can be alleged. Now it happens that, in order to make deep and representative investigation of the strata, it is necessary to use neutrons of high energies, since these are the ones which are susceptible of deep and representative penetration. Therefore, means have been discovered for eliminating the necessity of the insertion of an obstacle. However, certain preferred choices of penetrable material are contemplated in lieu of an obstacle, as will appear. An obstacle may be used if convenient, and its use, together with the other elements of the present apparatus, comes within the scope of this invention. Herewith are provided means of eliminating from consideration the neutrons which penetrate any intervening mass of penetrable material that may be employed in lieu of an obstacle. For this purpose it is provided that, when an obstacle is used, it be composed of substance containing atomic nuclei having properties which differ largely from the nuclear properties pertaining to material composing the rock adjacent to the bore hole. For example, since many heavy nuclei possess relatively many and very widely distributed quantized energy levels, such a substance as mercury, thallium, or bismuth, intervening in the space between the source and detector would not selectively remove quantities of energy from neutrons passing through by steps of one million electron volts. On the other hand, nuclei of atoms of which the rock consists do cause removal of kinetic energy by steps of approximately one million electron volts order of magnitude. Since it has been determined, for example, that oxygen absorbs energy in steps of a particular size, one may bombard the formations with monoenergetic neutrons, making observations of the neutrons which are scattered from the rock with the specific loss of energy characteristic of oxygen. Having measured the flux of neutrons which have suffered such a loss of energy, one can compare the flux of partly de-energized neutrons which are found to be scattered from the formations or transferred through the obstacle, and the flux of neutrons which have energies lying closely adjacent to the energy of those which have been slowed down by colliding with oxygen. The next step is subtraction of the intensity of the specific energy group corresponding with oxygen. This subtraction adapts the method to take account of energy losses by such a prevalent non-specific phenomenon as conservative ballistic nuclear scattering, and gives a correct measurement of the energy group which suffered loss by specific reaction with oxygen. The corrected data provides specific information regarding the frequency of occurrence of the processes caused by oxygen. Since the obstacle does not cause any such processes, whatever effects may occur that are due to it will be cancelled out in the above correction, and it will be as though there were no obstacle. The correction which has been outlined is analogous to the procedure of subtracting the base line of a spectral photometer trace in the neighborhood of a specific absorption line caused by a substance which it is desired to identify and measure, in a case in which such substance is found intermingled in a medium possessed of general or distributed absorption of radiation.

In Figure 8 there is illustrated schematically a system for effecting the above subtraction. In this figure there are shown two channels which originate in a system for detecting neutrons which represents in each channel pulses caused by specific energies of neutrons. Channel 1 from this detecting system is adjusted to deliver pulses which correspond with the arrival in the detector of neutrons having energy approximately equal to $E_1$, where $E_1$ is the energy of a neutron derived from the monoenergetic source, after it has lost the specific amount of energy characteristic of oxygen. Channel 2 from the detector is adjusted to deliver pulses which correspond with the arrival in the detector of neutrons having energy approximately equal to $E_2$ differing slightly from $E_1$, but in the vicinity of $E_1$. Pulse rate conversion circuit 62, which receives the signal of channel 1, produces therefrom an E.M.F. proportional to the time-rate of arrival of pulses in channel 1. Pulse rate conversion circuit 62 is shown in detail in Figure 8A. The operation of this circuit is as follows: a positive pulse is impressed upon the control grid of tube V–13 which is normally non-conducting. This pulse is amplified and appears at the plate of tube V–13 as an amplified negative pulse. This amplified pulse is then transmitted to the control grid of tube V–14 which is normally conducting. Tube V–14 may be a 6SJ7. The negative pulse cuts off the current in tube V–14 thus lowering the bias potential across the cathode resistor R–53. This causes the current to rise in tube V–13. The circuit remains in this condition with tube V–13 conducting and tube V–14 non-conducting for a period of time the length of which is dependent upon the values of the following circuit elements: resistances R–46, R–52, and R–53, plus condenser C–24. When the condenser C–24 is sufficiently discharged to allow tube V–14 to again become conducting there is feedback of a negative pulse through condenser C–23 to the control grid of tube V–13. This reduces the current in tube V–13 which causes a positive pulse to be impressed upon tube V–14. Thus the positive feedback of this circuit rapidly drives tube V–13 again to cutoff and tube V–14 to a saturated conducting condition. The circuit remains in this condition until the next pulse is received from the detecting system. The positive feedback of the system and the high gain tubes used result in well-shaped uniform pulses. The output of this circuit appears on the plate of tube V–14. This is transmited through condenser C–26 to the grid of tube V–15. The circuit used with tube V–15 is a long time-constant circuit with fixed bias on the cathode. The long time-constant plate circuit is direct coupled to the control grid of tube V–16. The positive pulses appearing on control grid of tube V–15 are appreciated as longer negative pulses in the long time-constant plate circuit. The effect is to integrate pulses over a short period of time. Thus the potential at the control grid of tube V–16 is a slowly varying positive, direct current potential depending for variation on the time-rate of occurrence of the pulses. The less positive the voltage at this point, the greater are the number of pulses being received. Tube V–16 may be a triode-connected 6AC7. Any drop in the potential of the control grid of tube V–16 causes the current to fall in the tube. This, in turn, causes the potential of the cathode to fall, this increasing the current flow in resistors R–57, R–58 and R–59. Hence, the IR drop in R–57 is increased, thus providing a lower input potential to the recorder.

The corresponding circuit of detector channel 2, which is identified as element 63 in Figure 8, likewise produces a D.C. signal in its output, which is subtracted from the output of element 62 by being connected electrically in series opposition to the output of the element 62. The difference signal is delivered to the cable 64 which connects the above recited subtraction apparatus to a suitable recorder 65 at the surface of the earth. The recorder is adapted to make a record of the difference versus depth, the depth axis being actuated by a measuring wheel, not shown, through a gear box 66.

In the above discussion oxygen has been named as an illustration of a substance to be detected. Such choice, however, is not to be taken in any sense as a limitation. This discovery applies equally well to the delineation of silicon, aluminum, chlorine, carbon, magnesium, nitrogen, or any other elements which it is or may be desired to identify, adjacent to a bore hole. Because it may be considered that specific information regarding the absorption properties of some of these elements is not definitely known for neutrons, there is provided in this method a procedure for determining the requisite properties, in order that use may be made of this information in adjusting well logging apparatus for conditions of optimum performance.

Figure 9:
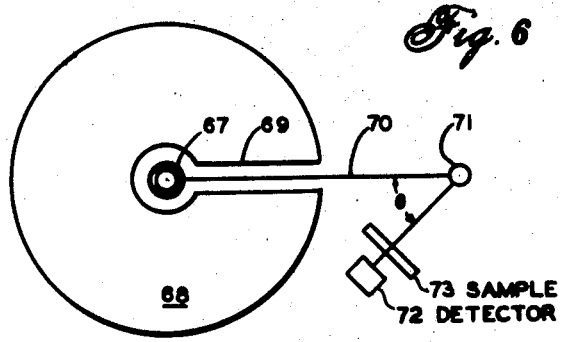
Figure 9 illustrates diagrammatically means for obtaining information about the absorption in a sample of neutrons having a particular energy.

In Figure 9 a system is illustrated for determining the existence and location of nuclear resonances for interaction between nuclei contained in a sample and a stream of bombarding fast neutrons. These nuclear resonances will correspond with specific energy losses which can be used on considering the adjustment of a detector of fast neutron radiation such as was set forth in connection with Figure 8. In this figure there is shown a source of monoenergetic fast neutrons 67 almost surrounded by a mass of paraffin 68. Through this mass of paraffin there is provided a narrow opening 69 from which emerges a narrow beam of neutrons 70 which impinges upon a mass of hydrogenous material 71. Material 71 serves to scatter neutrons derived from the beam 70. The diameter of the hydrogenous mass 71, which may be spherical in shape, is sufficiently small that neutrons of the beam 70 will generally be scattered by having only one collision with a hydrogen nucleus in the mass 71 rather than a plurality of collisions which would occur if the diameter of mass 71 is excessive. A detector 72 is located for and adapted to rotation about mass 71 as a center. A sample 73 is situated at a constant distance from the detector 72 and maintained always on a direct line joining the center of the detector and the center of the scattering mass 71. The angle of rotation determines exactly the loss of energy which a neutron from the beam 70 will suffer in being deflected by the object 71 in the direction of the detector 72. Since all the neutrons of the beam 70 have equal energies, the neutrons passing through the sample and in through the detector will also have, at their incidence upon the sample, equal but smaller energies, smaller than the energies of the neutrons in the beam 70. The energies of the neutrons incident upon the sample will, accordingly, vary from the energy of the source for $\theta = 180°$ to practically nothing for $\theta = 0$, and there will be for each value of $\theta$ a corresponding value of the energy within the above range. One may accordingly restate $\theta$ as a scale of energy and plot the transmission of neutrons through the sample as a function of energy by varying $\theta$. Minima in the said function of energy will correspond with a specific reaction in the sample suffered by the neutrons at that energy.

Conditions of optimum performance may also be chosen by purely empirical experiments, in which operating conditions are chosen arbitrarily, in wells logged in which the occurrence of the various elements penetrated by these wells has been ascertained independently through chemical analysis of cores. Nevertheless, there has been provided, in addition to other methods of selectively studying neutron radiation as influenced by a particular element, a means of making such selective study altogether without any knowledge of the nuclear properties of the element. This procedure consists in a combination of method and apparatus relying upon a general discovery regarding absorption of radiation which has been made. This general discovery is that: for successive absorption of any kind of radiation by a selective absorber, a smaller proportional influence upon the flux of radiation is produced, in the case where the radiation has already been shielded by a similar selective absorber. Now if it is agreed, for example, that chlorine is a selective absorber of neutrons, then it is self-evident that the influence of a chlorine filter will be smaller in the presence of neutron radiation already filtered by matter containing chlorine, than it would be for radiation similarly derived and similarly filtered in other respects, and through a medium otherwise the same in which the chlorine is absent. Therefore, in order to observe the presence of a particular element in the strata adjacent to a bore hole, a measurement of fast neutrons should be made by means of a fast neutron detector which has no shield around it, or at most a layer of material not containing the particular element which it is desired to identify. Further, a second measurement will be made in which the detector of neutrons, otherwise similar, will be surrounded by a layer of shielding material composed of a substance rich in the element which it is desired to detect, or, if possible, wholly composed of such element.

It is preferable in practicing this discovery to maintain the distance between the neutron source and the detector of neutrons, which is alternately shielded and unshielded, at a small enough distance from the source such that there will be a considerable proportion of primary fast neutrons traversing the matter in the vicinity of the detector of neutrons.

We claim:

1. A method of identifying petroleum that exists in certain of the underground formations penetrated by a well which comprises irradiating the formations with a source of fast neutrons, measuring the relative loss of neutron flux caused by hydrogen, simultaneously measuring the fraction of the remaining flux consisting of fast neutrons which have suffered a specific energy loss characteristic of oxygen, and simultaneously recording said measurements as indicative of the concurrent relative presence of hydrogen and relative absence of oxygen and therefore of the relative presence of petroleum.

2. A method of identifying petroleum that exists in certain of the underground formations penetrated by a well, that comprises measuring the relative concentration of carbon and the relative concentration of hydrogen in strata suspected of containing petroleum, by irradiating the formations with fast neutrons, measuring the relative number of fast neutrons returning into the well bore as indicative of the relative presence of hydrogen, simultaneously measuring the relative number of fast neutrons returning into the well bore which have suffered a specific energy loss characteristic of carbon as indicative of the relative presence of carbon, and simultaneously recording said measurements as indicative of the concurrent relative presence of hydrogen and carbon and therefore of hydrocarbons.

3. A method of identifying petroleum that exists in certain of the underground formations penetrated by a well that comprises irradiating the formations with a flux of fast neutrons, simultaneously measuring the relative number of fast neutrons returning to the well as indicative of the relative presence of hydrogen, simultaneously measuring the relative number of fast neutrons returning to the well which have suffered a specific energy loss characteristic of carbon as indicative of the relative presence of carbon, simultaneously measuring the relative number of fast neutrons returning to the well which have suffered a specific energy loss characteristic of oxygen as indicative of the relative presence of oxygen, and simultaneously recording said measurements as indicative of the concurrent relative presence of hydrogen, carbon and oxygen and therefore indicative of the relative presence of water and hydrocarbons.

4. A method of identifying petroleum that exists in certain of the underground formations penetrated by a well that comprises irradiating the formations with a flux of fast neutrons, simultaneously measuring the relative number of fast neutrons returning to the well as indicative of the relative presence of hydrogen, simultaneously measuring the relative number of fast neutrons returning to the well which have suffered a specific energy loss characteristic of oxygen, and combining said measurements to derive a measurement indicative of the concurrent relative presence of hydrogen and relative absence of oxygen and therefore indicative of the relative presence of petroleum.

References Cited in the file of this patent

UNITED STATES PATENTS

| | | |
|---|---|---|
| 2,390,433 | Fearon | Dec. 4, 1945 |
| 2,469,463 | Russell | May 10, 1949 |
| 2,483,139 | Kerzog | Sept. 27, 1949 |
| 2,543,676 | Mayer et al. | Feb. 27, 1951 |

OTHER REFERENCES

Electronic Classifying, Cataloging, and Counting Systems, by G. Howard Parsons, AECD–1827, declassified March 25, 1948.

Pulse Height Analyzer Model A, by W. A. Higinbotham, MDDC–1173, declassified August 8, 1947.